R. ZÖBL.
SEPARABLE FASTENER.
APPLICATION FILED JULY 20, 1920.
1,368,316.
Patented Feb. 15, 1921.
Fig.1.
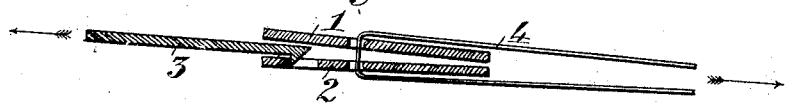
Fig.2.
Fig.3. Fig.4. Fig.5.
 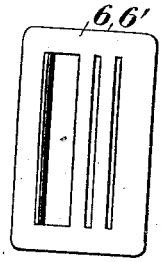 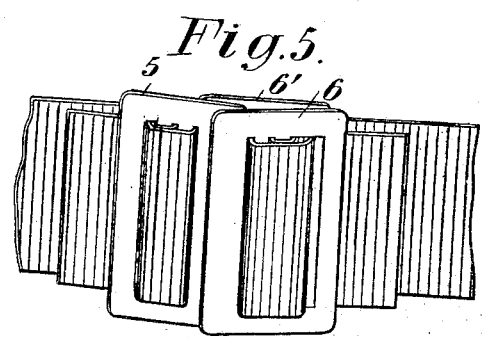
Fig.6. Fig.7.
 
Fig.8.
Inventor
R. Zöbl,
By H. R. Kerslake.
Attorney

UNITED STATES PATENT OFFICE.

RAFAEL ZÖBL, OF VIENNA, AUSTRIA.

SEPARABLE FASTENER.

1,368,316.

Specification of Letters Patent.    Patented Feb. 15, 1921.

Application filed July 20, 1920. Serial No. 397,802.

*To all whom it may concern:*

Be it known that I, RAFAEL ZÖBL, a citizen of German Austria, residing at Vienna III, Rechte Bahngasse 12, Austria, have invented certain new and useful Improvements in Separable Fasteners, of which the following is a specification.

This invention has for its object to provide an improved connector more particularly adapted for use as a buckle, which shall constitute a reliable fastening, while also being capable of being undone very simply.

The novel feature of the improved connector consists in this that one connector half is constituted by two plates or frames or the like which are held up against each other by the pull of the device to be connected, the other connector half being anchored and gripped tightly between the said two plates or frames or the like.

According to a further development of the invention the two gripping plates or the like may be connected together in such a manner as to be capable of being opened; this connection being effected if desired by the device to be connected.

The shape of the frames and their anchoring depends in each particular case upon the nature of the device to be connected and upon the particular purpose of use in view.

The subject matter of the invention is illustrated diagrammatically in Figures 1 and 2 of the accompanying drawings:—Fig. 1 illustrating the improved connector in the closed position; and Fig. 2 showing the same open.

Figs. 3 to 7 illustrate as a particular constructional example of the invention a buckle for an elastic band, such as is used for instance as braces or garters.

Fig. 8 is a section showing the parts connected.

In the diagrammatic illustration (Figs. 1 and 2), 1 and 2 are the two gripping members, and 3 is the connector half which is designed to be slipped in between the said gripping members. The device 4 to be connected is drawn through slots or the like in the members 1, 2 and therefore, when the connector is closed (Fig. 1) and a pull is exerted upon the said device in the direction of the arrows, the said device will produce upon the two members 1, 2, a gripping action that will prevent any possibility of the "anchoring" produced for instance by the hooked engagement of the member 3, becoming automatically undone.

The improved connector can be easily opened by turning or bending the member 3 in the direction of the arrow (Fig. 2) whereby the ends of the members 1, 2 are caused, in opposition to the action of the pull on the connector or to any other resistances such as friction, elasticity, to move so far away from each other as to produce an undoing of the hooked engagement.

The members 1, 2 operate like pivoting flaps that are pivoted at their inner ends.

If desired, a real hinge or the like may be provided at the pivot ends in cases where the relative positions and mutual support of the members are not thoroughly assured.

The buckle given by way of example is composed similarly of a hook member 5 (Fig. 3) and two gripping members 6, 6' which are identically similar in the case illustrated (Fig. 4). The hook member 5 comprises one wide slot and two narrow slots through which the rubber band is drawn as shown in cross section in Fig. 6. The hook member engages at an acute angle, so that it can be disengaged only by bending the member 5 in opposition to the gripping action of the members 6, 6'. For the purpose of facilitating the insertion of the member 5 in between the members 6, 6', it is made wedge-shaped at the insertion end.

The two gripping members, 6, 6' which comprise likewise two narrow slots and one wide slot, when turned through an angle of 180 degrees, lie one on the other in such a manner that the two intermediate cross pieces between the slots coincide exactly with each other, whereas the cross pieces at the ends close respectively the wide slots. The rubber band is inserted (as shown in Fig. 6) in such a manner that the relative position of the members 6, 6' is always assured, and no other connection is required.

At the place where the member 5 is inserted, the ends of the members 6, 6' are beveled so as to form a funnel-shaped enlarged aperture for facilitating the insertion of the member 5.

Owing to the situation of the narrow slots in the members 6, 6' outside the center, the end of the member constituting the abutment for the hook projects beyond the end of the other gripping member. This projecting end therefore constitutes a support for the member 5 in its inclining or turning movement, so that this member 5 acts like a lever in opening the grip. Since the depth of the engagement of the hook is made different according to the purpose of use, the shape of the "arrow" 6, 6' is so chosen as to cause the distance between the two ends aforesaid to increase the deeper the engagement of the hooks.

Fig. 5 is a front view of the buckle in the closed condition.

Fig. 8 illustrates the engagement of the connector halves; the hooked member is shown curved at the engaging end, this shape being preferred for garters where it is necessary that the connector shall fit the curvature of the leg.

What I claim is:—

1. A separable fastener comprising a clamp formed of a plurality of superposed substantially flat plates, one of which is provided with a shoulder arranged near one of its edges, tensioning means securing said plates together in a manner to normally force said plates toward one another and to permit certain opposite edges of the plates to be moved apart, and an insertible plate provided near one end with a projection designed to be inserted between the plates of the clamp and engaged with said shoulder.

2. A separable fastener of the kind defined by claim 1 in which the edge portions of the clamp plates, between which the projection is inserted are normally spaced apart to permit ready insertion of said projection.

3. A separable fastener of the kind defined by claim 1 in which the projection is provided with a beveled face to facilitate its insertion between the plates of the clamp.

4. A separable fastener of the kind defined by claim 1 in which certain edge portions of the clamp plates are normally spaced apart and in which the projection is provided with a beveled face designed to be inserted in the space between the clamp plates to facilitate the insertion of said projection.

5. A separable fastener of the kind defined by claim 1 in which the clamp plates are slotted and the means which secures them together consists of a strap passing through said slots.

6. A separable fastener comprising a plurality of superposed plates, one of said plates being provided on one side with beveled faces, a shoulder provided on the same side of said plate, and said plate being slotted, the other plate being provided on its side adjacent to the first plate with beveled edge portions, the second plate being also provided with slots and a solid portion of the second plate being arranged opposite the shoulder of the first plate, means passing through the slot in said plate for securing said plates together, and an insertible plate provided with a projection designed to be inserted between said plates and engaging said shoulder, said projection being capable of detachment from said shoulder by turning the insertible plate around one edge of the first plate to force the second plate away from the first plate sufficiently to permit the withdrawal of the projection.

7. A separable fastener of the kind defined by claim 6 in which the projection is provided with oppositely beveled faces to facilitate its insertion between the clamp plates.

In testimony whereof I have signed my name to this specification.

RAFAEL ZÖBL.